US010049434B2

(12) United States Patent
Mosher et al.

(10) Patent No.: US 10,049,434 B2
(45) Date of Patent: Aug. 14, 2018

(54) SYSTEMS AND METHODS FOR OBJECT DETECTION (71) Applicant: THE BOEING COMPANY, Huntington Beach, CA (US)

(72) Inventors: Aaron Y. Mosher, Madison, AL (US); Charles Robert Kreienheder, Kirkwood, MO (US)

(73) Assignee: THE BOEING COMPANY, Chicago, IL (US)

( * ) Notice: Subject to any disclaimer, the term of this patent is extended or adjusted under 35 U.S.C. 154(b) by 113 days.

(21) Appl. No.: 14/884,066

(22) Filed: Oct. 15, 2015

(65) Prior Publication Data
US 2017/0109891 A1 Apr. 20, 2017

(51) Int. Cl.
*G06K 9/00* (2006.01)
*G06T 5/00* (2006.01)
(Continued)

(52) U.S. Cl.
CPC .......... *G06T 5/002* (2013.01); *G06K 9/00624* (2013.01); *G06T 1/20* (2013.01); *G06T 7/11* (2017.01); *G06T 7/13* (2017.01); *G06T 7/136* (2017.01); *G06T 7/70* (2017.01); *G06T 7/90* (2017.01); *G06T 2200/24* (2013.01); *G06T 2207/10024* (2013.01); *G06T 2207/20024* (2013.01); *G06T 2207/30232* (2013.01); *G06T 2210/12* (2013.01)

(58) Field of Classification Search
None
See application file for complete search history.

(56) References Cited

U.S. PATENT DOCUMENTS 5,046,119 A 9/1991 Hoffert et al.
6,160,902 A 12/2000 Dickson et al.
(Continued)

OTHER PUBLICATIONS

Merino et al., "Cooperative Fire Detection using Unmanned Aerial Vehicles", Proceedings of the 2005 IEEE International Conference on Robotics and Automation, Barcelona, Spain, Apr. 2005, pp. 1884-1889.*

(Continued)

*Primary Examiner* — Matthew Bella
*Assistant Examiner* — Jose M Torres
(74) *Attorney, Agent, or Firm* — Armstrong Teasdale LLP (57) ABSTRACT A computing device for detecting an object of interest in an image is provided. The computing device includes a memory device and a processor to process image data by evaluating pixel contrast to facilitate detecting an edge transition in an image, by identifying neighboring pixels that are above a predetermined contrast value, which represent a potential object of interest, filtering the pixels based on color information to identify areas where there is a color edge transition, applying a convolution filter mask to yield regions of pixels having a localized concentration of contrast and color changes, applying a threshold filter for identifying those pixel regions having values that are greater than a predetermined threshold value and grouping the identified pixel regions into one or more groups representing an object of interest, and generating an alert to notify an operator that the object of interest in the image has been detected.

16 Claims, 9 Drawing Sheets (51) Int. Cl.
*G06T 7/70* (2017.01)
*G06T 1/20* (2006.01)
*G06T 7/11* (2017.01)
*G06T 7/13* (2017.01)
*G06T 7/90* (2017.01)
*G06T 7/136* (2017.01)

(56) References Cited

U.S. PATENT DOCUMENTS

| | | | |
|---|---|---|---|
| 6,539,126 B1 | 3/2003 | Socolinsky et al. | |
| 6,567,537 B1 | 5/2003 | Anderson | |
| 8,170,272 B1* | 5/2012 | Joslin | G06K 9/00637 348/61 |
| 8,731,305 B1 | 5/2014 | Mantri | |
| 8,958,602 B1* | 2/2015 | Lane | G06T 7/246 348/143 |
| 2001/0016053 A1 | 8/2001 | Dickson et al. | |
| 2003/0108237 A1 | 6/2003 | Hirata | |
| 2003/0185420 A1* | 10/2003 | Sefcik | G06K 9/3241 382/103 |
| 2004/0008381 A1 | 1/2004 | Jacob et al. | |
| 2004/0263514 A1 | 12/2004 | Jin et al. | |
| 2005/0201597 A1 | 9/2005 | Wendt et al. | |
| 2007/0031042 A1 | 2/2007 | Simental et al. | |
| 2008/0144013 A1 | 6/2008 | Lanoue et al. | |
| 2008/0285856 A1* | 11/2008 | Zahavi | G06K 9/50 382/195 |
| 2009/0022359 A1 | 1/2009 | Kang et al. | |
| 2009/0123070 A1 | 5/2009 | Xiaoying et al. | |
| 2009/0271719 A1 | 10/2009 | Clare et al. | |
| 2012/0155714 A1 | 6/2012 | Douglass et al. | |
| 2012/0330722 A1 | 12/2012 | Volpe et al. | |
| 2013/0039574 A1 | 2/2013 | McKay et al. | |
| 2013/0148893 A1* | 6/2013 | Markham | G06K 9/3241 382/190 |
| 2013/0163822 A1 | 6/2013 | Chigos et al. | |
| 2014/0226024 A1* | 8/2014 | Limbaugh | H04N 5/23203 348/169 |
| 2015/0071489 A1 | 3/2015 | Weismuller et al. | |

OTHER PUBLICATIONS

Teutsch et al., "Detection, Segmentation, and Tracking of Moving Objects in UAV Videos", 2012 IEEE Ninth International Conference on Advanced Video and Signal-Based Surveillance, pp. 313-318.*

Moranduzzo et al., "An Object Detection Technique for Very High Resolution Remote Sensing Images", 2013 8th International Workshop on Systems, Signal Processing and their Applications, pp. 79-83.* http://www.sentientvision.com, © 1999-2004 Sentient Pty Ltd.

* cited by examiner

SYSTEMS AND METHODS FOR OBJECT DETECTION

BACKGROUND

The field of the disclosure relates generally to visual analysis of objects, and, more particularly, to detecting objects in an image using a computationally efficient methodology.

At least some existing systems for large area searches require a user to survey a scene with their eyes in person or by monitoring a video screen. However, the user's attention may be distracted, and it may be tiring to watch a screen for extended periods of time without losing attention. Accordingly, automated systems may be used to automatically identify objects of interest. However, at least some known automated systems are computationally intensive, requiring high-performance computing devices.

BRIEF DESCRIPTION

In one aspect, a computing device for detecting an object of interest in an image is provided. The computing device includes a memory device, and a processor communicatively coupled to the memory device and having encoded instructions which when executed are configured to process image data by evaluating pixel contrast to facilitate detecting an edge transition in an image, by identifying neighboring pixels that are above a predetermined contrast value, which represent a potential object of interest, filtering the pixels based on color information to identify areas of high contrast where there is a color edge transition, applying a convolution filter mask to yield regions of pixels having a localized concentration of contrast and color changes, applying a threshold filter for identifying those pixel regions having values that are greater than a predetermined threshold value and grouping the identified pixel regions into one or more groups representing an object of interest, and generating an alert to notify an operator that the object of interest in the image has been detected.

In another aspect, a method for identifying an object of interest in an image is provided. The method includes evaluating, using a computing device, pixel contrast to facilitate detecting an edge transition in an image, by identifying neighboring pixels that are above a predetermined contrast value, which represent a potential object of interest, filtering, using the computing device, the pixels based on color information to identify areas of high contrast where there is a color edge transition, applying, using the computing device, a convolution filter mask to yield regions of pixels having a localized concentration of contrast and color changes, applying, using the computing device, a threshold filter for identifying those pixel regions having values that are greater than a predetermined threshold value and grouping the identified pixel regions into one or more groups representing an object of interest, and generating, using the computing device, an alert to notify an operator that the object of interest in the image has been detected.

In yet another aspect, a system for detecting an object of interest in an image is provided. The system includes a camera configured to acquire an image, and a computing device communicatively coupled to the camera and configured to evaluate pixel contrast to facilitate detecting an edge transition in an image, by identifying neighboring pixels that are above a predetermined contrast value, which represent a potential object of interest, filter the pixels based on color information to identify areas of high contrast where there is a color edge transition, apply a convolution filter mask to yield regions of pixels having a localized concentration of contrast and color changes, apply a threshold filter for identifying those pixel regions having values that are greater than a predetermined threshold value and grouping the identified pixel regions into one or more groups representing an object of interest, and generate an alert to notify an operator that the object of interest in the image has been detected.

DETAILED DESCRIPTION

The implementations described herein facilitate detecting an object of interest in an image. To detect the object, image processing includes evaluating pixel contrast to facilitate detecting an edge transition, filtering pixels based on color information, applying a convolution filter mask, and applying a threshold filter for identifying pixel regions for grouping into one or more groups representing an object of interest. When one or more objects of interest are detected, an appropriate alert is generated to notify a user of the detection. Further, the location of each object of interest may be indicated within the image.

Figure 1:
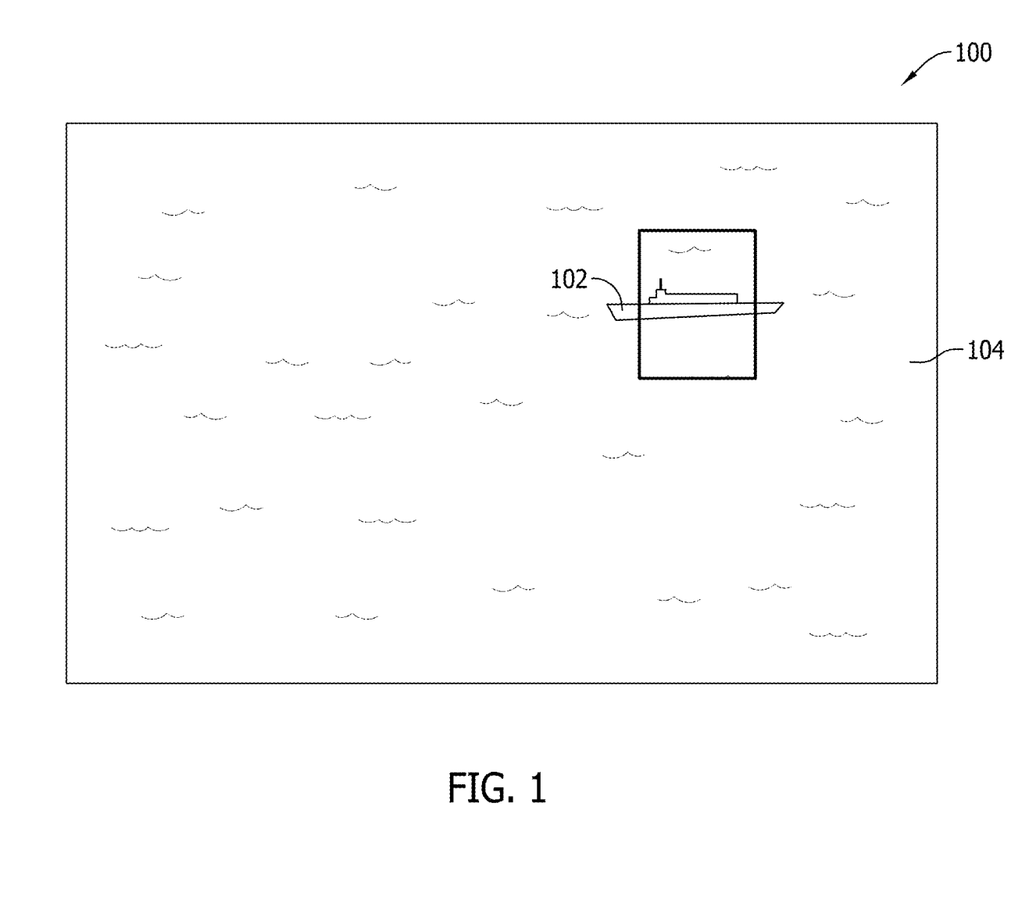
FIG. 1 is an exemplary image.

FIG. 1 is an exemplary image 100. Image 100 may be a frame of a video, or may be an independent static image (e.g., a photograph). Image 100 includes an object of interest 102 visible on a surface of a body of water 104 (e.g., an ocean or lake). In the exemplary implementation, object of interest 102 is a boat. As will be appreciated by those of skill in the art, object of interest 102 may be any suitable type of object in any suitable environment. For example, objects of interest 102 may be people, buildings, animals, devices, etc., and environments could include terrain, water, sky, etc. For clarity, object of interest 102 is identified with a box in image 100.

Figure 2:
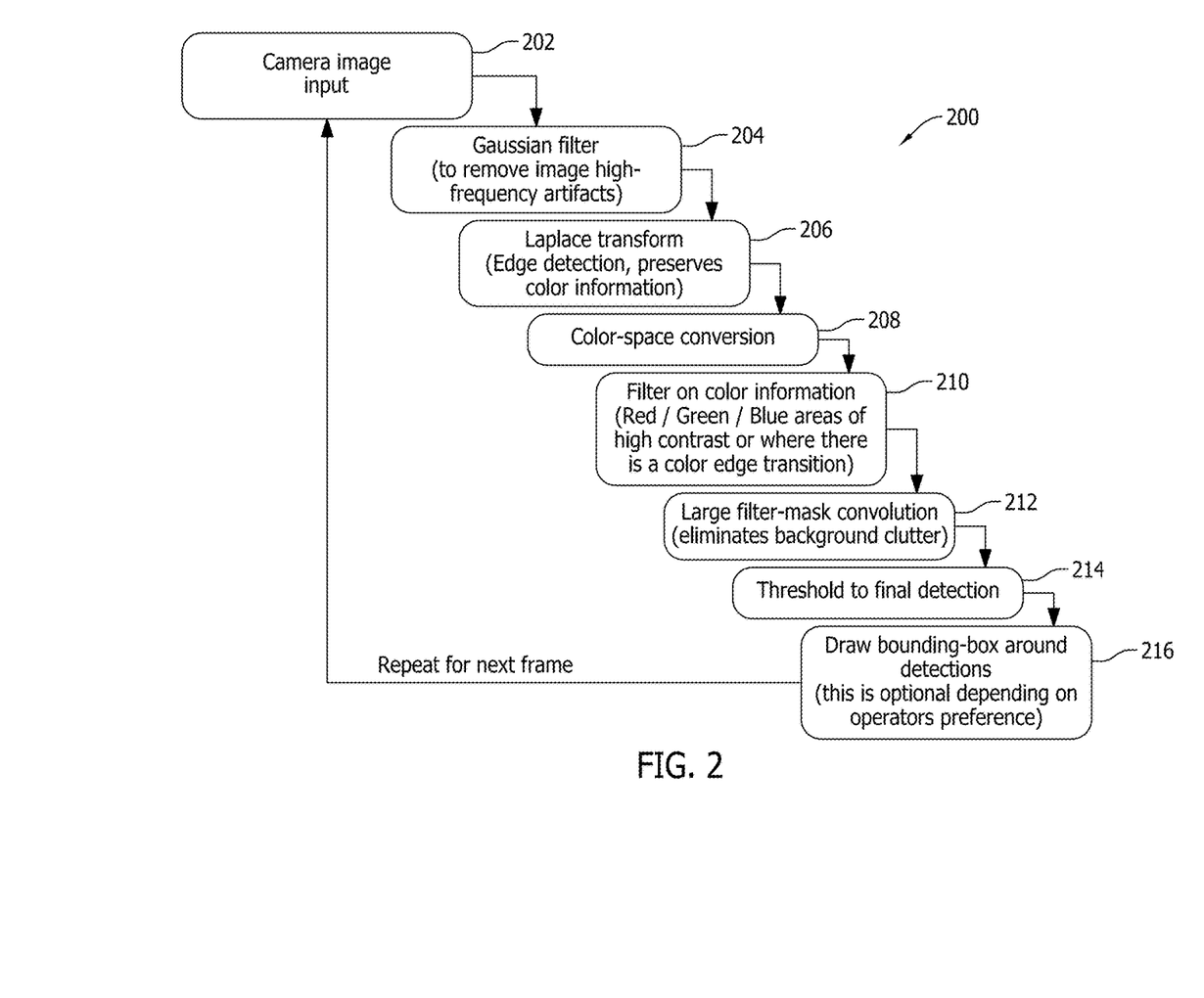
FIG. 2 is a flow diagram of an exemplary method for detecting an object of interest in the image shown in FIG. 1.

FIG. 2 is a flow diagram of an exemplary method 200 for detecting an object, such as object of interest 102. Method 200 is performing by an image processing computing device, as described in detail below. Method 200 facilitates detecting one or more objects of interest in an image, such as image 100.

At block 202, an image is received from a camera or other optical device. As noted above, the image could be an independent still image or a single frame from a video. At block 204, a Gaussian filter is applied to the image to facilitate removing high-frequency artifacts in the frame.

At block 206, a Laplace transform is applied to the image. The Laplace transform is applied for edge detection purposes. Specifically, neighboring pixels that are above a predetermined contrast value are identified, as they may represent a potential object of interest. The Laplace transform also preserves color information in the image.

At block 208, a color-space conversion is applied to the image. Subsequently, at block 210, the image is filtered based on color information. Specifically, in the exemplary implementation, red, green, and blue areas of high contrast are filtered to identify color edge transitions.

At block 212, a large filter-mask convolution is applied to the image. This eliminates background clutter from the image and generates localized concentrations of contrast/color changes. Finally, after the image processing steps of blocks 204, 206, 208, 210, and 212 have been performing, a thresholding operation is performed on the image to isolate an object of interest at block 214. In the exemplary implementation, the thresholding operation uses a thresholding filter to identify those pixel regions with values greater than a predetermined threshold value and groups the identified pixel regions into one or more groups representing at least one object of interest. The thresholding operation may be adjustably tuned to set a sensitivity for detecting objects of interest.

At block 216, in the exemplary implementation, a bounding box (or other visual indicia) is drawn around the isolated object in the image, such that the object is easily locatable within the image to a user viewing the image (e.g., on a display device). Alternatively, the bounding box may not be drawn (e.g., based on a user preference). For subsequent images, flow returns to block 202.

In some implementations, method 200 includes different and/or additional steps. For example, to facilitate detecting lifeboats and lifejackets in the water, method 200 may include a user-selectable mode that filters the image for any red-colored objects. Further, as described below, a "line fitting" step may be used to automatically detect a horizon on the image.

Figure 3:
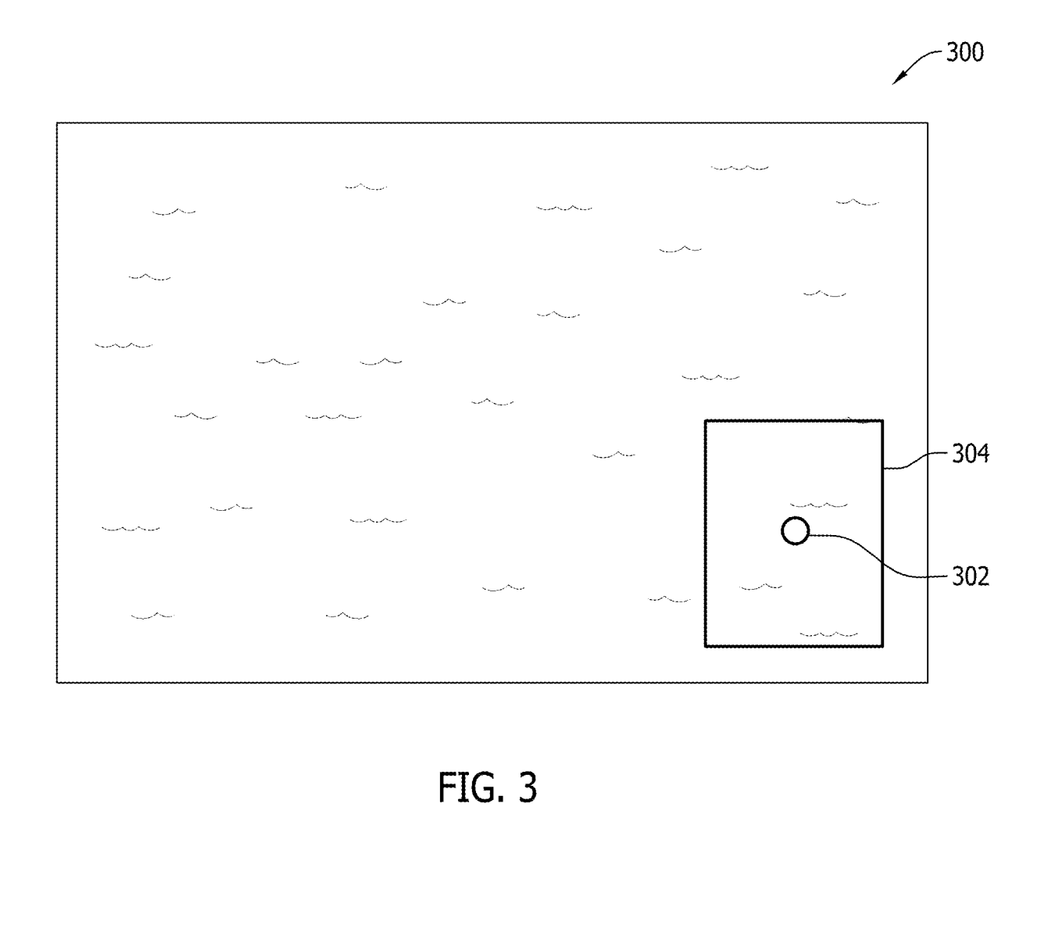
FIG. 3 is an exemplary image that may be processed using the method shown in FIG. 2.

FIG. 3 is an exemplary image 300 that may be processed using method 200. As shown in FIG. 3, image 300 includes an object of interest 302. For clarity, a bounding box 304 is already shown as drawn on the image 300. However, those of skill will appreciate that, in accordance with method 200, bounding box 304 is not drawn on image 300 until object 302 is detected in image 300.

Figure 4:
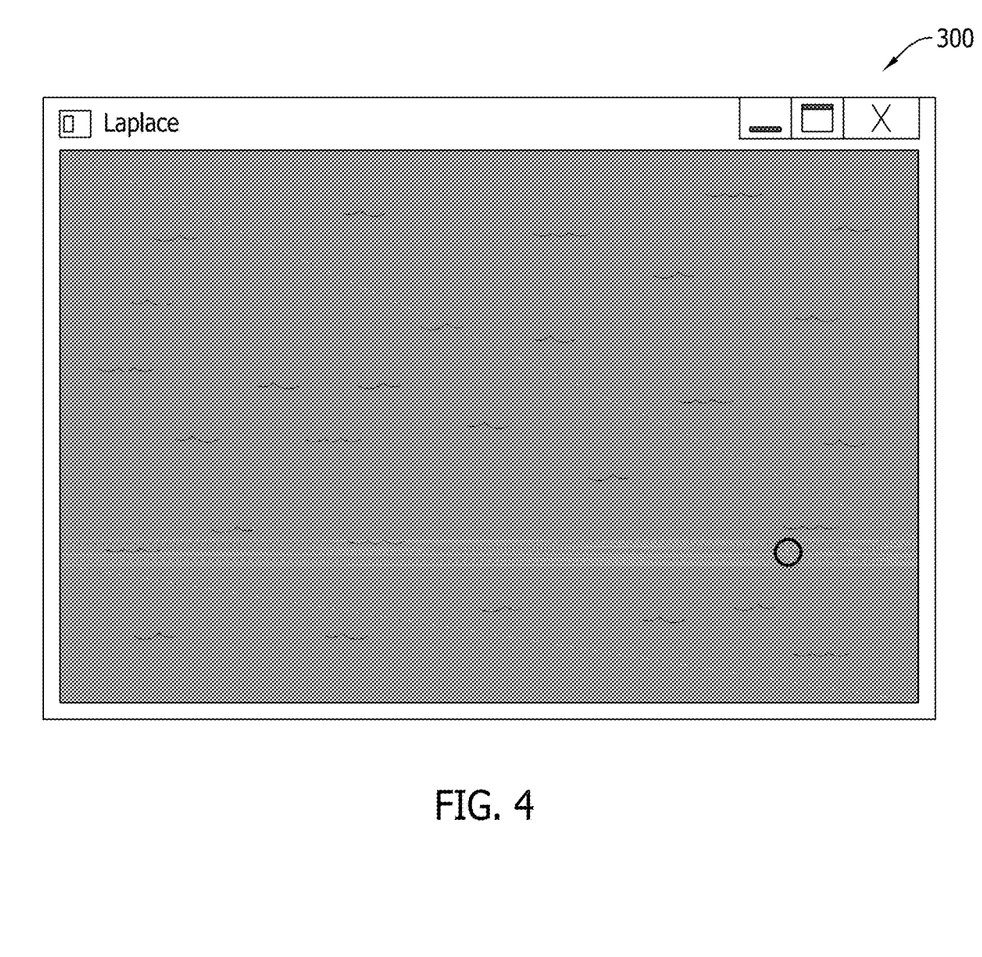
FIG. 4 shows the image of FIG. 3 after applying a Laplace transform.
Figure 5:
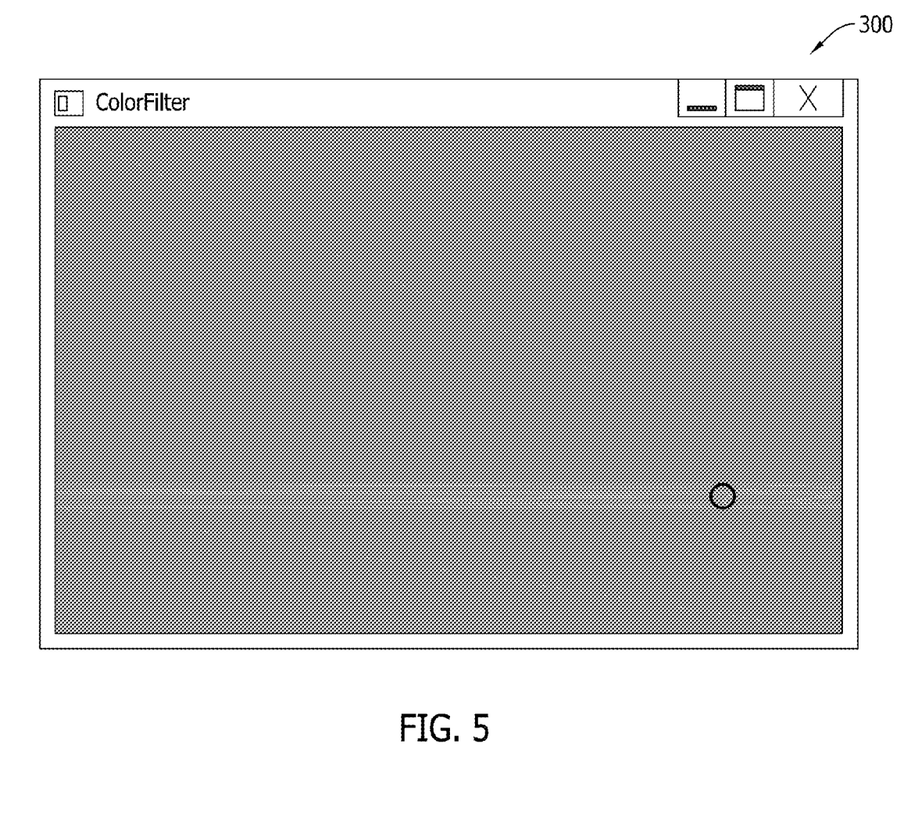
FIG. 5 shows the image of FIG. 3 after a color filtering process.
Figure 6:
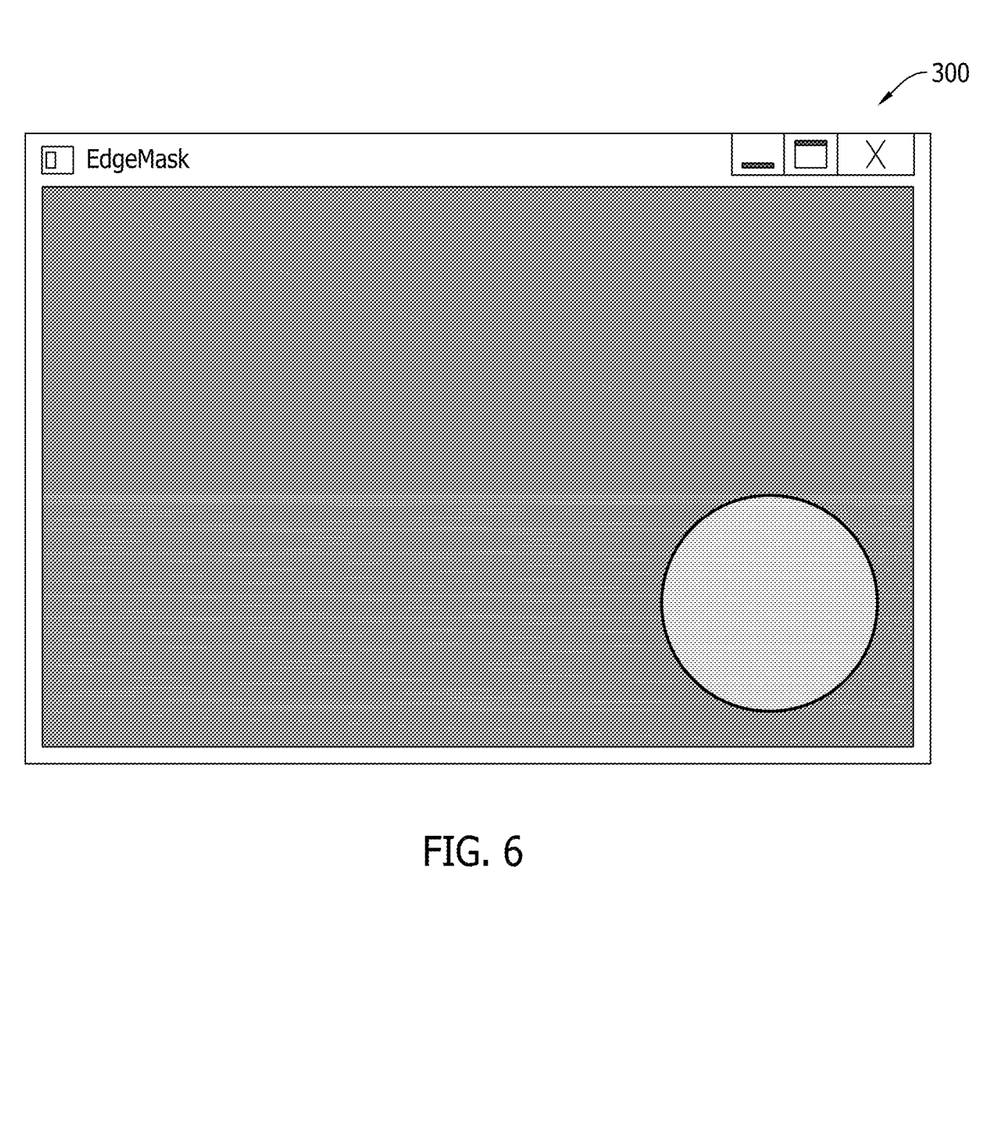
FIG. 6 shows the image of FIG. 3 after applying the large filter-mask convolution.

FIG. 4 shows image 300 after applying the Laplace transform of block 206, FIG. 5 shows image 300 after the color filtering of block 210, FIG. 6 shows image 300 after applying the large filter-mask convolution of block 212. In the exemplary implementation, for the color filtering (shown in FIG. 5), a user-selectable "color-channel" control may be used to detect specific colors or all combined colors. For example, the color filtering may be set to detect red colors to facilitate detecting lifejackets and lifeboats. Further, other settings may be used to detect other marine objects (e.g., navigation markers and buoys are typically green or red).

In the exemplary implementation, method 200 is performed using a general purpose graphics processing unit (GPGPU) "system-on-a-chip" processor. This processor includes a GPGPU and a central processing unit (CPU) in the same package. Accordingly, different steps of method 200 may be performed by the GPGPU and/or CPU. For example, in the exemplary implementation, blocks 202 and 216 are performed by the CPU, and blocks 204, 206, 208, 210, 212, and 214 are performed by the GPGPU. Notably, GPGPU operations may be performed concurrently with CPU operations. Thus, while a bounding box is being drawn in a previous image (i.e., block 216), the next image is already being processed by GPGPU. This enables method 200 to be performed with high computational efficiency.

Figure 7:
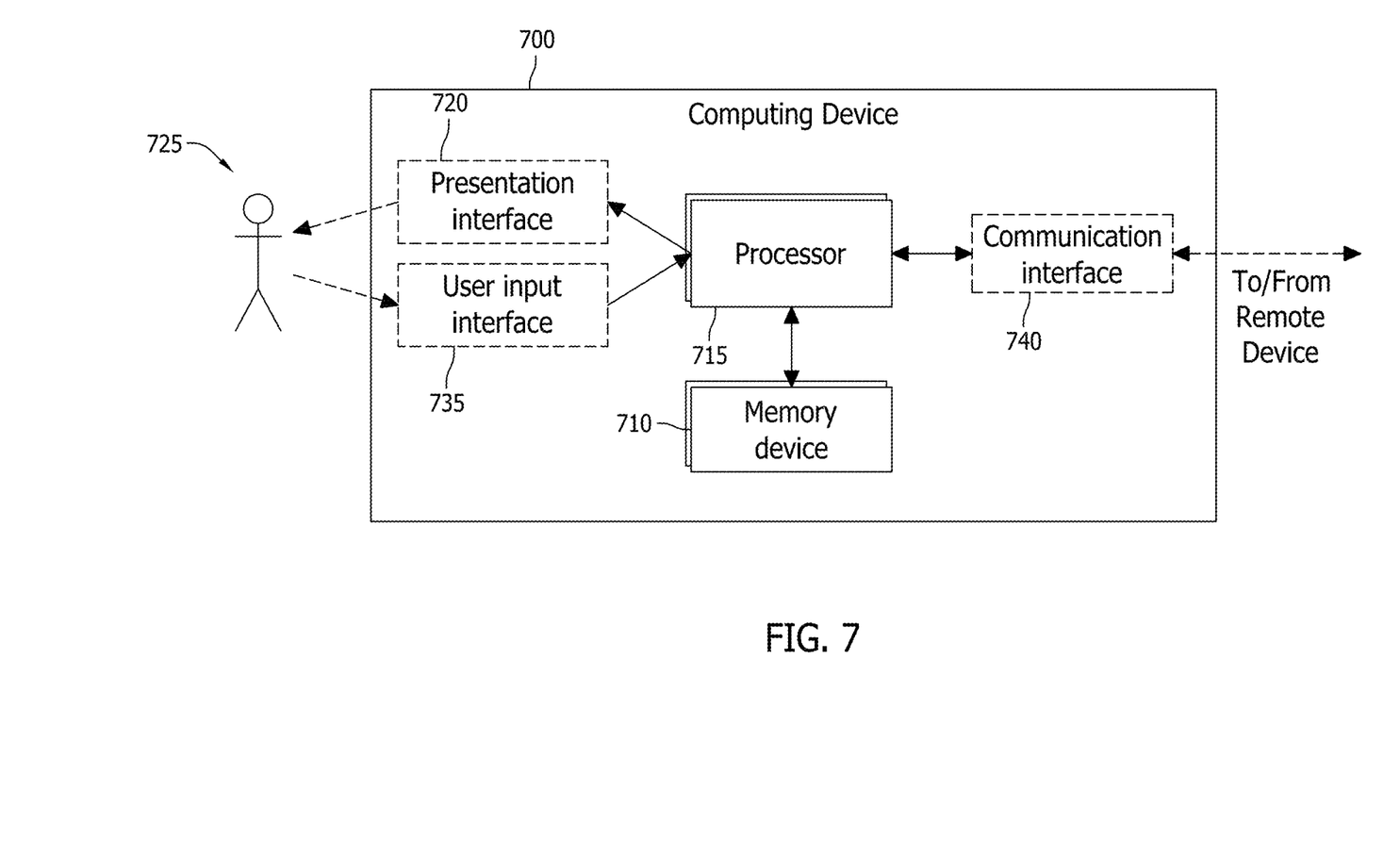
FIG. 7 is a block diagram of an exemplary computing device that may be used to perform the method show in FIG. 2.

FIG. 7 is a block diagram of computing device 700 that may be used to perform method 200 (shown in FIG. 2). For example, computing device 700 may be implemented using a GPUGPU and/or CPU of a "system-on-a-chip", as described above. Computing device 700 includes at least one memory device 710 and a processor 715 that is coupled to memory device 710 for executing instructions. In some implementations, executable instructions are stored in memory device 710. In the exemplary implementation, computing device 700 performs one or more operations described herein by programming processor 715. For example, processor 715 may be programmed by encoding an operation as one or more executable instructions and by providing the executable instructions in memory device 710.

Processor 715 may include one or more processing units (e.g., in a multi-core configuration). Further, processor 715 may be implemented using one or more heterogeneous processor systems in which a main processor is present with secondary processors on a single chip. In another illustrative example, processor 715 may be a symmetric multi-processor system containing multiple processors of the same type. Further, processor 715 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary implementation, memory device 710 is one or more devices that enable information such as executable instructions and/or other data to be stored and retrieved. Memory device 710 may include one or more computer readable media, such as, without limitation, dynamic random access memory (DRAM), static random access memory (SRAM), a solid state disk, and/or a hard disk. Memory device 710 may be configured to store, without limitation, application source code, application object code, source code portions of interest, object code portions of interest, configuration data, execution events and/or any other type of data.

In the exemplary implementation, computing device 700 includes a presentation interface 720 that is coupled to processor 715. Presentation interface 720 presents information to a user 725. For example, presentation interface 720 may include a display adapter (not shown) that may be coupled to a display device, such as a cathode ray tube (CRT), a liquid crystal display (LCD), an organic LED (OLED) display, and/or an "electronic ink" display. In some implementations, presentation interface 720 includes one or more display devices.

In the exemplary implementation, computing device 700 includes a user input interface 735. User input interface 735 is coupled to processor 715 and receives input from user 725. User input interface 735 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 720 and user input interface 735.

Computing device 700, in the exemplary implementation, includes a communication interface 740 coupled to processor 715. Communication interface 740 communicates with one or more remote devices. To communicate with remote devices, communication interface 740 may include, for example, a wired network adapter, a wireless network adapter, and/or a mobile telecommunications adapter.

Figure 8:
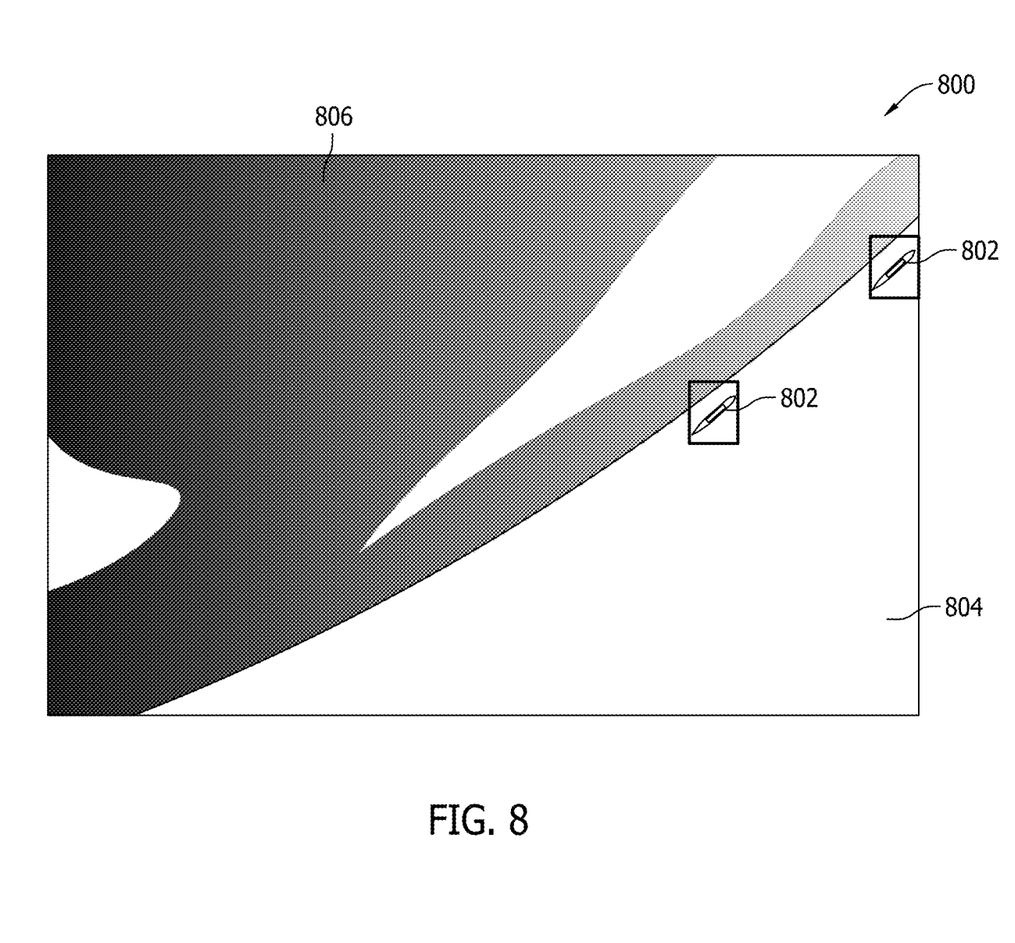
FIG. 8 is an exemplary image.
Figure 9:
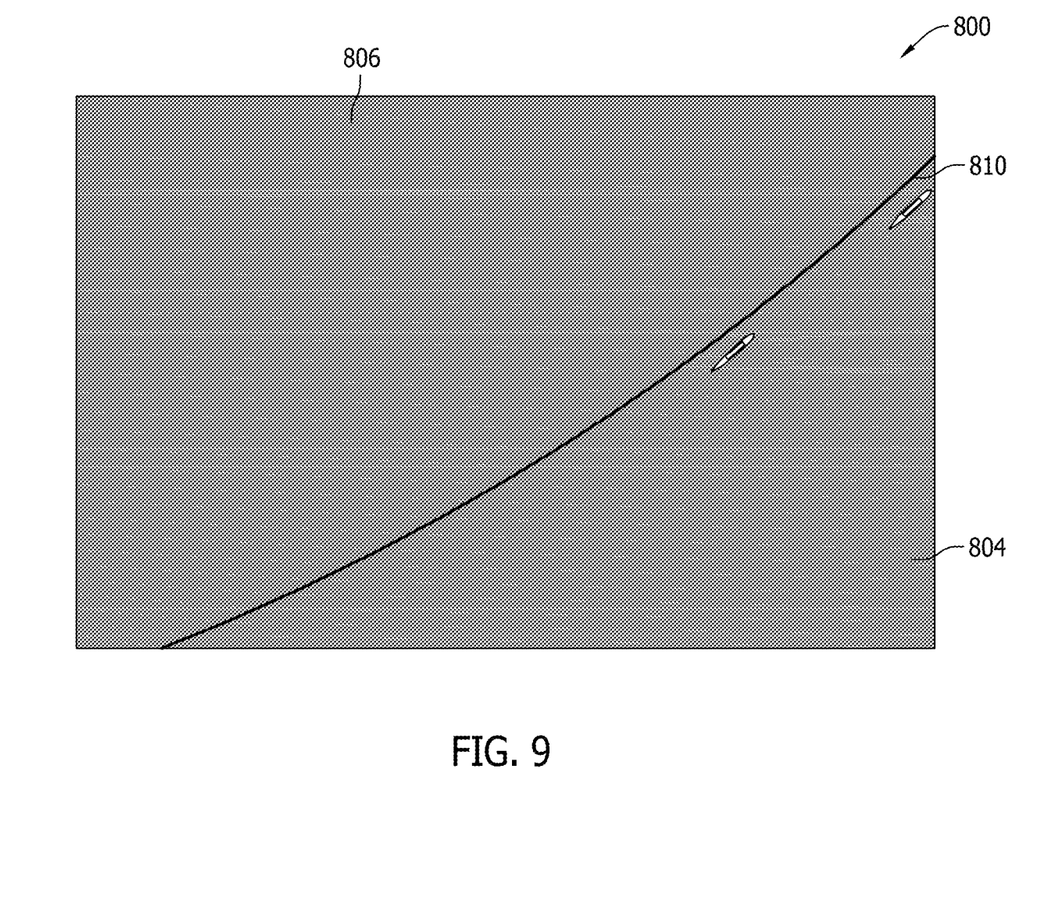
FIG. 9 illustrates a horizon identified from the image shown in FIG. 8.

To facilitate performing method 200, in some implementations, computing device 700 performs a horizon detection step, and ignores data above the horizon during the image processing steps of method 200. FIG. 8 is an exemplary image 800 including two objects of interest 802 on a body of water 804. Notably, a large portion of image 800 is sky 806 above body of water 804. When attempting to identify objects of interest 802, sky 806 can be ignored. Accordingly, as shown in FIG. 9, computing device 700 identifies a horizon 810 between body of water 804 and sky 806. Subsequently, during the steps of method 200, computing device 700 ignores data above identified horizon 810, further increasing the computational efficiency of method 200.

Further, detecting the horizon may aid this or other image-processing algorithms by allowing a user to specify objects be searched for only above or below the horizon. Automatically detecting the horizon also facilitates removing undesired detections that may otherwise occur at the horizon due to the visual interface of the water with the sky, and allows filtering to include detections only at the horizon (e.g., distant ships instead of nearby ships). Horizon detection may also aid in automated/unmanned vehicle navigation (e.g., the horizon position is an important reference during flight).

In some implementations, computing device 700 also performs tracking functionality. That is, after detecting an object of interest in an image, computing device 700 tracks a position of the detected object of interest over subsequent frames. Further, in some implementations, computing device 700 uses or communicates with a classification system to classify (i.e., identify) the detected object of interest, such that the object of interest can be persistently tracked even after disappearing from view and reappearing in subsequent images.

As described above, computing device 700 may be implemented using a "system-on-a-chip" processor. Further, method 200 is computationally efficient. This enables computing device 700 to have relatively low size, weight, and power (SWAP) requirements. Accordingly, in some implementations, computing device 700 and/or portions of computing device 700 may be located onboard a vehicle (e.g., an unmanned aerial vehicle (UAV) or other unmanned vehicle). In such implementations, the images analyzed may be acquired using a camera or other optical receiver included on the vehicle. Further, in some implementations, the image may include data outside of the visible spectrum.

In the exemplary implementation, computing device 700 generates one or more real-world outputs for a user. For example, upon detecting an object, computing device 700 may notify a user using suitable audio/visual techniques. Further, in some implementations, a user may be looking for a particular object (e.g., a boat). Using a user input device, user may instruct computing device 700 to generate an audio and/or visual alert when the particular object is detected.

The systems and methods described herein facilitate detecting an object of interest in an image. To detect the object, image processing includes evaluating pixel contrast to facilitate detecting an edge transition, filtering pixels based on color information, applying a convolution filter mask, and applying a threshold filter for identifying pixel regions for grouping into one or more groups representing an object of interest. When an object of interest is detected, an appropriate alert is generated to notify a user of the detection. When the object of interest is detected in the image, the computing device may generate an audio and/or visual alert to alert a user, in conjunction with the overlay of a bounding box or other visual indicia that is overlaid on the display of the image around the isolated object in the image, such that the object is easily locatable within the image to a user (e.g., on a display device).

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computing device for detecting an object of interest in an image comprising a plurality of pixels, the image being acquired from a vehicle, the computing device comprising:
   a memory device; and
   a processor communicatively coupled to said memory device and having encoded instructions that, when executed, are configured to process image data for the plurality of pixels in the image acquired onboard the vehicle by:
      applying a Laplace transform to respective contrast values of the plurality of pixels to detect edge transitions in the image, the Laplace transform identifying neighboring pixels among the plurality of pixels that are above a predetermined contrast value and thereby represent a potential object of interest;
      filtering the plurality of pixels based on color information to identify areas of high contrast where there is a color edge transition;
      applying a convolution filter mask to the plurality of pixels to yield a set of regions among the plurality of pixels having localized concentrations of contrast and color changes;
      applying a threshold filter to identify a subset of pixel regions having contrast values that are greater than a predetermined threshold value and grouping the identified subset of pixel regions into one or more groups representing an object of interest on a surface of a body of water; and
      generating an alert to notify an operator that the object of interest on the surface of a body of water in the image acquired on board the vehicle has been detected, wherein said processor is further configured to output a visual indicia overlaid on a display of the image to notify the operator the object of interest has been detected in the image.

2. The computing device of claim 1, wherein said processor is configured to generate an output including an audible alert to notify the operator that the object of interest has been detected in the image.

3. The computing device of claim 2, further comprising a camera included on an aerial vehicle that acquires the image and a display device communicatively coupled to said processor and configured to display the image and the alert.

4. The computing device of claim 3, wherein said processor is configured to generate a bounding box around the object of interest that is overlaid on the display of the image to notify the operator of the location of the object of interest in the image.

5. The computing device of claim 1, wherein said processor comprises a general purpose graphics processing unit (GPGPU) and a central processing unit (CPU) that functioning as coprocessors to process image data.

6. The computing device of claim 1, wherein the threshold filter is configured to be adjustably tuned to set a sensitivity for detecting objects of interest.

7. A method for identifying an object of interest in an image comprising a plurality of pixels, the image being acquired from a vehicle, the method comprising:
applying, using a computing device, a Laplace transform to respective contrast values of the plurality of pixels in the image acquired onboard the vehicle to detect edge transitions in the image, the Laplace transform identifying neighboring pixels among the plurality of pixels that are above a predetermined contrast value and thereby represent a potential object of interest;
filtering, using the computing device, the plurality of pixels based on color information to identify areas of high contrast where there is a color edge transition;
applying, using the computing device, a convolution filter mask to the plurality of pixels to yield a set of regions among the plurality of pixels having localized concentrations of contrast and color changes;
applying, using the computing device, a threshold filter to identify a subset of pixel regions having contrast values that are greater than a predetermined threshold value and grouping the identified subset of pixel regions into one or more groups representing an object of interest on a surface of a body of water; and
generating, using the computing device, an alert to notify an operator that the object of interest on the surface of a body of water in the image acquired on board the vehicle has been detected, and outputting a visual indicia overlaid on a display of the image to notify the operator the object of interest has been detected in the image.

8. The method of claim 7, wherein generating an alert comprises generating an audible alert to notify the operator that the object of interest in the image has been detected, wherein the image depicts a surface of a body of water.

9. The method of claim 7, further comprising generating a bounding box around the object of interest that is overlaid on a display of the image to notify the operator of the location of the object of interest in the image.

10. The method of claim 7, further comprising tuning the threshold filter to set a sensitivity for detecting objects of interest.

11. The method of claim 7 wherein evaluating, using a computing device, pixel contrast comprises evaluating using a computing device that includes a general purpose graphics processing unit (GPGPU) and a central processing unit (CPU) that functioning as coprocessors.

12. The method of claim 7, further comprising:
identifying a horizon in the image; and
ignoring pixel data above the horizon or below the horizon.

13. A system for detecting an object of interest in an image, the system comprising:
a camera disposed onboard a vehicle and configured to acquire an image comprising a plurality of pixels; and
a computing device communicatively coupled to said camera and configured to:
applying a Laplace transform to respective contrast values of the plurality of pixels to detect edge transitions in the image, the Laplace transform identifying neighboring pixels among the plurality of pixels that are above a predetermined contrast value and thereby represent a potential object of interest;
filter the plurality of pixels based on color information to identify areas of high contrast where there is a color edge transition;
apply a convolution filter mask to the plurality of pixels to yield a set of regions among the plurality of pixels having localized concentrations of contrast and color changes;
apply a threshold filter to identify a subset of pixel regions having contrast values that are greater than a predetermined threshold value and grouping the identified subset of pixel regions into one or more groups representing an object of interest on a surface of a body of water; and
generate an alert to notify an operator that the object of interest on the surface of the body of water in the image acquired by the camera has been detected, the alert including a visual indicia generated by said computing device and overlaid on a display of the image to notify the operator.

14. The system of claim 13, wherein said camera and said computing device are installed on an unmanned vehicle.

15. The system of claim 13, wherein said computing device is configured to generate a bounding box around the object of interest, the bounding box overlaid on the display of the image to notify the operator of the location of the object of interest in the image.

16. The system of claim 13, wherein said computing device is configured to generate an output including an audible alert to notify the operator that the object of interest has been detected in the image.

* * * * *